Patented Sept. 11, 1934

1,973,430

UNITED STATES PATENT OFFICE 1,973,430

PROCESS FOR BREAKING OIL-FIELD PETROLEUM-WATER EMULSIONS

Leo P. Curtin, Cranbury, N. J.

No Drawing. Application March 17, 1933,
Serial No. 661,419

6 Claims. (Cl. 196—4)

The present invention resides in a method of treating emulsions of petroleums and aqueous liquids, e. g. water or water containing dissolved or suspended materials, such as the so-called oil-field petroleum-water emulsions, in such manner as to permit the economical recovery of the petroleum.

Many petroleums, particularly those produced in the southwestern and western parts of the United States, contain substances which are effective emulsifying agents for water-in-oil emulsions, and many oil wells produce such petroleums, together with substantial quantities of emulsions, the disperse phase of which consist of subterranean waters.

Various methods have been proposed for recovering the petroleum from such emulsions, such as (1) evaporating the water by heat, (2) high speed centrifuging, (3) electrical treatment, such as the application of the principle of the Cottrell precipitator, (4) the addition of solvents, such as gasoline, and (5) the addition of chemical reagents. The chemical reagents usually employed are of the type which tend greatly to alter the interfacial tension relations between the oil and the aqueous liquid thereby rendering the emulsion unstable and permitting a separation of the oil and the aqueous liquid by centrifuging or gravity. Typical substances in this class are ammonium oleate, sodium resinate, various sulphonic acids and their salts, sodium carbonate, various esters, cresylic acid, and oleic acid. Large quantities of petroleum are recovered from emulsions by these methods, particularly by method (5) involving the addition of chemical compounds or mixtures which have emulsion-breaking properties. Some petroleum-water emulsions, such as those containing asphalt base and mixed base petroleum oils, are, however, so stable that they cannot effectively be broken by any of the methods heretofore proposed, and it is estimated that more than one hundred million barrels of petroleum are contained in accumulations of so-called unbreakable emulsions in the southwestern oil fields which cannot economically be recovered by established methods. The present invention is concerned primarily with the treatment of these stable or so-called unbreakable oil-field emulsions.

It is well known that the most important group of emulsifying agents of petroleum consists of bodies of unknown composition which are known collectively as asphaltic bodies. The usual conception of a water-in-oil emulsion is a droplet of an aqueous liquid surrounded by a thin shell or film of asphaltic substance which in turn is surrounded by the oil which constitutes the continuous phase of the system. Such systems are believed to be rendered stable by electro-static forces, the details of which need not be considered here. The emulsions with which the present invention is concerned generally contain at least 5 percent or within the range of from 5 percent to 50 percent of asphaltic bodies calculated on the petroleum-oil content thereof.

If some substance which has the effect of unbalancing this condition of stable equilibrium is added to the continuous phase, the emulsion is no longer stable and the water particles, being heavier, separate from the oil by gravity or, more quickly, by centrifuging. The application of heat accelerates the emulsion-breaking and the separation of the two phases.

I have found that the substance known as "low-temperature tar" is very effective in breaking emulsions such as have been described. This substance is a by-product from the low-temperature carbonization of coal and is characterized by the presence of substantial quantities of cyclo-paraffins and other non-aromatic hydrocarbons, and also by the presence of some 25 to 40 percent, more or less, of bodies of phenolic character, commonly called "tar acids". In the treatment of some petroleum-water emulsions the tar itself is most effective; with others one or another of various active fractions obtainable by distilling the tar is more advantageously used. In certain special cases the distillate from 300° C. to coke is best. In general, however, the crude low-temperature tar is more desirable than any fraction thereof and has the advantage of being less expensive. It will be understood that a considerable diversity exists in the properties of the emulsions and that the most effective treatment for each should be experimentally determined.

In carrying out the process the low-temperature tar, or a distillate fraction thereof, is added to the petroleum-water emulsion in the quantity found by test to be most effective, usually from about 0.5 to about 4 percent by volume calculated on the oil content of the emulsion; the resulting mixture is then heated and later subjected to centrifuging or allowed to stand until separation of the two phases takes place. The emulsion breaking agent, being an oil-soluble organic liquid, remains with the oil phase and becomes a part of the petroleum which is recovered from the emulsion.

For breaking emulsions of the type here under consideration, at temperatures below 100° C., I have found it necessary generally to use at least 1% by volume of the low-temperature tar, or a suitable fraction thereof, a temperature approaching 100° C., and a substantial treating time. A single instance has been noted in which 0.75% of the low-temperature tar was sufficient at a temperature of 95° C., and in other isolated instances I have found it possible to use a temperature as low as 60° C., provided the treating time was sufficiently long. Practically, however, none of the true asphalt or mixed base petroleum emulsions produced in the Mid-Continent, California and Mexican oil fields can be broken with any quantity of low-temperature tar or in any reasonable period of time up to several days at a temperature as low as 50° C. With regard to temperature I find it desirable and in most cases necessary to use the temperatures upward of 95° C. In one instance an emulsion from the Louisiana field, which showed no separation at 90° C., broke cleanly in two hours' treatment with an addition of 2.5% of low-temperature tar at 98–100° C. In many instances I have found it desirable to operate at temperatures above 100° C., e. g. 110 to 150° C., under pressure. By the use of such high temperatures I have succeeded in breaking some of the emulsions in a few minutes and with additions of low-temperature tar less than 1%. While as stated I prefer to use temperatures approaching 100° C. or higher, I consider 70° C. to be a practical lower limit for operation of the process, because at this temperature I have succeeded in breaking a number of samples of emulsion of the type described with quantities of low-temperature tar within the range from 1 to 4% and in periods of time within the range from 1 to 8 hours. The surprising advantages incident to the use of temperatures approaching 100° C. as compared with the use of lower temperatures, such as 50° C., has led me to the discovery of the utility of the use of temperatures well above 100° C., with the operation carried out under pressure. The use of such high temperatures up to say 150° C. or higher makes it possible to break some of the most refractory emulsions in a few minutes' time, whereas, in general, the use of temperatures below 100° C. requires a treatment for one hour or more, and usually several hours.

The conditions of operation discussed above may be summarized as embracing the treatment of asphalt or mixed base oil-field emulsions with quantities of low-temperature tar or a suitable fraction thereof in quantity amounting to from 0.5 to 4% by volume of the oil content of the emulsion at temperatures within the range of from 70° to 150° C. and for periods of time ranging from a few minutes to about 8 hours.

The following examples of the application of the process to specific emulsions are illustrative:

Example 1.—40 gallons of an emulsion from Tullos, La., which had resisted other known methods of emulsion breaking and which were being handled in an unsatisfactory manner by first a chemical treatment with sulphonated castor oil and then an electrical treatment, were placed in a steam jacketed kettle and heated for 12 hours at 90° C., after adding ½ gallon of low-temperature tar. This treatment resulted in a complete break, the yield being 20 gallons of water and 20 gallons of oil containing much less than $\frac{1}{10}$ of 1% of water with approximately 1 lb. of dirt and mineral matter which collected at the interface. Another batch of this same emulsion was treated under the same conditions, but at 110° C. Here a complete and satisfactory separation took place in one-half hour.

Example 2.—40 gallons of bottom settlings from the Eldorado, Kansas, field were treated at 97° C. for two hours, $\frac{1}{10}$ of a gallon of low-temperature tar being added. An excellent break was obtained in four hours, 17 gallons of water and 23 gallons of clean oil being obtained. The dirt at the interface was negligible in quantity.

Example 3.—40 gallons of a very heavy emulsion from Smackover, Ark., were treated at 95° C. for five hours, the quantity of low-temperature tar used being one-third gallon, or about 1%, based on the oil recovered. This operation yielded 30 gallons of clean, very heavy petroleum and 10 gallons of water, the amount of dirt at the interface being not more than one-quarter pound.

Example 4.—In this instance the material came from a BS pond in Oil Hill, Kansas, and had been exposed to the weather for a number of years. The material was so stiff that it could be shoveled at the ordinary temperature, but on heating to 90° C. became liquid. Forty gallons of this emulsion had $\frac{1}{10}$ gallons of low-temperature tar added to it and was held at 99° C. for 8 hours. The emulsion was well broken by this time, but the separation was unsatisfactory because of the extremely high viscosity of the oil. The test was repeated with 6 gallons of kerosene oil added as a diluent. In the latter case a good break was secured and the two phases separated satisfactorily. Not counting the added kerosene there were 21 gallons of clean, very viscous oil recovered, and 17 gallons of water. There was a deposit of mineral matter and other refuse which collected at the interface which weighed several pounds. This very heavy emulsion was later on tested at 125° C. with 2% of low-temperature tar added, based on the oil content. In this case a satisfactory break and separation took place in about one hour.

I am aware that it has been proposed to use cresylic acid, calcium cresylate, mixtures of cresylic acid with castor oil, sulphonated oils, as well as other materials, for the purpose of breaking such emulsions. My method is distinguished from such processes by the fact that the emulsion-breaking reagent which I use is primarily a hydrocarbon material; and also by the fact that such tar acids as are present are in general of much higher molecular weight than cresylic acid. For example, in the distillate boiling above about 300° C., there is no cresylic acid whatever. Although it is probable that these higher tar acids are the most active in breaking such emulsions, the hydrocarbon bodies which are also present in the low-temperature tar fractions used appear to contribute as well toward the breaking of the emulsion.

In a companion application Serial No. 443,933, now Patent No. 1,855,666, dated April 26, 1932, I have described and claimed the use of the low-temperature tar and fractions thereof for preventing the formation of emulsions in the so-called two-movement process for the impregnation of timber or the like so as to obviate the serious operating difficulties heretofore experienced in the operation of this process due to the formation of highly viscous emulsions.

This application is a continuation-in-part of my application Serial No. 443,932, filed April 12, 1930.

I claim:

1. Process of breaking emulsions consisting essentially of an aqueous liquid and a petroleum-oil containing asphaltic bodies which comprises mixing such emulsions with from 0.5% to 4% by volume calculated on the petroleum-oil content of the emulsion of low-temperature tar, and heating the mixture at a temperature of at least 70° C. for a period of at least several minutes.

2. Process as defined in claim 1 in which the mixture is heated to a temperature exceeding 90° C.

3. Process as defined in claim 1 in which the mixture is heated to a temperature exceeding 100° C. under superatmospheric pressure.

4. Process as defined in claim 1 in which the fraction of low-temperature tar obtained at 300° C. and above is employed.

5. Process as defined in claim 1 in which a temperature below 100° C. and at least 1% of low-temperature tar are employed.

6. Process as defined in claim 1 in which the petroleum-oil content of the emulsion contains at least 5 percent of asphaltic bodies.

LEO P. CURTIN.